United States Patent Office 2,776,714
Patented Jan. 8, 1957

2,776,714

PROCESS FOR OVERCOMING WATER BLOCKING OF A PETROLEUM PRODUCING WELL

Ray J. Stancliff, Jr., Arthur L. Draper, and Loren H. Jenks, Tulsa, Okla., assignors to Esso Research and Engineering Company, a corporation of Delaware No Drawing. Application August 3, 1954,
Serial No. 447,677

5 Claims. (Cl. 166—42)

This invention concerns a novel process for overcoming the difficulties caused by so-called "water blocking" of petroleum production wells. The invention employs a high vapor pressure, normally gaseous, water-soluble, agent which is injected into the reservoir through the production well in liquid phase condition. Thereafter the pressure required to inject this agent into the reservoir is released so as to cause the back flow of the injected liquid into the production well. This treatment serves to cause removal of water in the immediate vicinity of the petroleum well so as to minimize the problem of water blocking.

In producing petroleum oil from reservoirs in the earth, crude oil is caused to flow into producing wells penetrating an oil-bearing formation. Depending in part upon the well spacing which is economicaly practicable, oil must flow from a considerable volume of the reservoir into any given production well. In view of this funneling of oil into the production well it is apparent that the resistance to flow in the immediate vicinity of a production well necessarily constitutes a real bottleneck.

One of the problems which aggravates production of oil is known as water blocking. In general terms water blocking is a condition resulting from the presence of water within the pores of the producing formation in the immediate vicinity of a production well. Presence of water at this location sharply reduces the permeability to oil in the critical flow region at the production well. In the case of water-wet sands, after prolonged oil production flow of oil through the sands may gradually displace the water so as to return the sand to nearly its original permeability to oil. However this is often a very long process and limits the amount of oil which can be produced during the initial phases of production. Again in the case of oil wet sands, part of the permeabilitiy to oil is ordinarily permanently lost due to water blocking. It is consequently the principal purpose of this invention to provide a rapid and effective remedial treatment for conditioning the reservoir in the vicinity of a production well so as to overcome the problem of water blocking.

In accordance with this invention, an agent is injected into the reservoir adjacent the production well. The agent to be injected must be forced into the reservoir in liquid phase although it is essential for the purposes of this invention that the agent be normaly gaseous and that it have a high vapor pressure. It is also the particular feature of this invention to employ an agent which is readily absorbed by water. For the purposes of this invention the material which is best adapted to supply the required properties is ammonia. Ammonia has a relatively high critical temperature so that it can be liquefied at the temperature conditions existent in a reservoir. The pressures required to liquefy the ammonia are in the range of about 200 to 1000 lbs. per sq. in. at ordinary crude oil reservoir temperatures. These pressures may be readily attained by using conventional injection compressors. Ammonia is readily absorbed by water in very substantial amounts. This absorption of the ammonia by water aids in the elimination of water blocking in two ways: first of all absorption of ammonia by water results in an enormous increase in the volume of the aqueous solution. As a result, this essentially serves to expand the water so as to force the water from small capillaries in which it may be trapped. Secondly, after absorption of ammonia in water, by releasing the pressure maintained at the production well, vaporization of ammonia occurs in a manner forcing water through the reservoir toward the production well. For these reasons the present invention is particularly concerned with the use of ammonia as a unique injection agent for treating a producing well to overcome water blocking. At the same time, it is contemplated that other liquefiable gases having high vapor pressures can be employed to obtain at least some of the benefits of this invention.

The amount of ammonia required in the treatment of a producing well to secure the benefits of this invention is a relatively small amount. In general conditions of water blocking create a critical bottleneck at the production well for a radius of only about 3 to 5 ft. around the bore hole. Because of this consideration, relatively small amounts of ammonia are required in order to secure the necessary removal of water in this restricted region. In general it is contemplated that about one barrel of liquefied ammonia is to be used per linear ft, of sand corresponding to the thickness of the producing formation at the production well. For example, in conditioning a production well penetrating a producing formation having a thickness of about 20 ft., approximately 20 bbls. of ammonia are required. It is apparent that somewhat greater quantities of ammonia can be employed although use of substanitally greater quantities is economically unjustified.

In the practice of this invention, as the first step of the operation, a slug or bank of liquid ammonia is injected into a production well at a suitable pressure to maintain the ammonia in liquid phase during injection.

This treatment can preferably be applied to a production well immediately after the well has been completed so as to eliminate water in the producing formation caused by water invasion during drilling and completion of the well. A convenient technique for injecting the ammonia is to first pump the ammonia into the production well at any desired pressure and to thereafter pump a fluid such as natural gas after the ammonia at a pressure of about 1000 lbs. per sq. in Injection of the natural gas following the ammonia serves to ensure liquefaction of the ammonia and serves to force the liquefied ammonia outwardly from the production well into the producing formation in the immediate vicinity of the production well. In the practice of this invention it is probable that the initial injection of liquid ammonia serves to displace a portion of the water in the water blocked area so as to force the water away from the bore hole. This effect aids in minimizing the water blocking condition although a more important effect is secured by the absorption of ammonia in the water adjacent the bore hole. This absorption of ammonia is accompanied by a very great increase in the volume of water traped in the pores of the producing formation. Since most of the water is retained in many cases by minute capillaries in the producing formation, this expansion causes water to be forced from the smallest capillaries. These phenomena occur during injection of the ammonia while the ammonia is being forced through the producing formation immediately adjacent the production well.

It is preferred that sufficient drive gas, such as natural gas, be injected so as to drive the liquid ammonia from the immediate vicinity of the bore hole for a distance of about 5 to 10 ft. from the bore hole. Effective displacement of the ammonia can be secured in driving it for this distance so that the ammonia can exist as a substantially unitary band or pool about the bore hole.

In the final step of this process the high pressure maintained at the production well during injection of the ammonia is released so that pressure at the bore hole is dropped to substantially atmospheric pressure.

The manner in which pressure is released after injection of the ammonia is an important feature of this invention. In the case of a reservoir having a relatively high natural pressure, it is particularly desirable to gradually release pressure at the production well to secure flow of the aqueous ammonia solution with a minimum of ammonia vaporization. This serves to remove the greatest proportion of water from the reservoir while obtaining the full benefit of the "swelling" properties of ammonia referred to. This technique can be employed when the pressure existent in the reservoir is of about the magnitude required to maintain the ammonia in liquid phase in the reservoir. However, for reservoirs having relatively low pressures this technique cannot be employed since vaporization and diffusion of the ammonia into the reservoir would result. In this case, then, it is more desirable to sharply release the pressure at the production well.

This results in imposition of a substantial pressure differential between the band of liquid ammonia and the bore hole. Ammonia will be virtually flashed to gas phase causing rapid flow of ammonia through the volume of the reservoir immediately adjacent the production well. This results in sweeping residual water from the vicinity of the well bore so as to substantially eliminate the water blocking.

As described therefore, the present invention concerns the injection of liquid ammonia into the reservoir adjacent a production well. By the mechanism described, the subsequent flow of ammonia into the production well physically displaces the water present. It should be observed that this technique not only serves to materially improve productivity of a well bore by eliminating conditions of water blocking, but also by causing a decrease in the connate water content of the formation adjacent the bore hole. Substantially complete recovery of the injected ammonia can be achieved, by pumping the bore hole so as to recover the injected ammonnia. Alternatively residual ammonia and expelled water will be produced from the bore hole as production of crude oil from the well is initiated.

What is claimed is:

1. A process for increasing the productivity of a water-blocked petroleum well penetrating a producing formation comprising injecting liquid ammonia through the well into the producing formation in the immediate vicinity of the well, applying pressure to the producing formation to maintain the ammonia in liquid phase and to force the ammonia into the formation, thereafter releasing pressure at the well to cause efflux of the injected ammonia, and recovering ammonia, crude oil and water from the formation through the well.

2. The process defined by claim 1 in which about one barrel of liquid ammonia is injected per linear foot of the thickness of the producing formation.

3. Process defined by claim 1 in which the said liquid ammonia is injected at pressures in the range of about 200 to 1000 lbs. per sq. in.

4. A process for improving the productivity of a water-blocked petroleum well comprising the steps of: injecting a bank of liquid ammonia at a pressure of about 200 to 1000 p. s. i., thereafter injecting an inert gas at a pressure of about 1000 lbs. per sq. in. to force the bank of liquid ammonia for a distance of about 5 to 10 ft. into the producing formation about the well, and finally releasing pressure at the well and recovering ammonia, water and crude oil from the said well.

5. The process defined by claim 4 in which the natural pressure in the reservoir is substantially that required to maintain the ammonia in liquid phase and the pressure is gradually released at the well.

References Cited in the file of this patent

UNITED STATES PATENTS

| | | |
|---|---|---|
| 949,567 | Flanegin | Feb. 15, 1910 |
| 1,954,973 | Zaniboni | Apr. 17, 1934 |
| 2,241,253 | Garrison | May 6, 1941 |
| 2,379,561 | Bennett | July 3, 1945 |